United States Patent [19]
Sudo et al.

[11] Patent Number: 5,262,233
[45] Date of Patent: Nov. 16, 1993

[54] AGRICULTURAL FILM

[75] Inventors: Kiyomaro Sudo; Seiya Mori; Tadao Okada; Hajime Ikeno; Keiko Shichijo; Shunichi Ohnishi, all of Mie, Japan

[73] Assignee: Mitsubishi Petrochemical Co., Ltd., Tokyo, Japan

[21] Appl. No.: 836,959

[22] Filed: Feb. 19, 1992

[30] Foreign Application Priority Data

Feb. 19, 1991 [JP] Japan .................. 3-024262
Oct. 21, 1991 [JP] Japan .................. 3-272500
Nov. 5, 1991 [JP] Japan .................. 3-288270

[51] Int. Cl.$^5$ .................................... B32B 27/08
[52] U.S. Cl. .................... 428/327; 428/331; 428/516; 428/520; 428/910; 47/29
[58] Field of Search ........... 428/910, 520, 516, 331, 428/327; 47/29

[56] References Cited

U.S. PATENT DOCUMENTS

| | | | |
|---|---|---|---|
| 4,064,314 | 12/1977 | McKenzie | 428/494 |
| 4,559,381 | 12/1985 | Tapia et al. | 524/405 |
| 5,061,558 | 10/1991 | Fischer et al. | 428/412 |

FOREIGN PATENT DOCUMENTS

| | | |
|---|---|---|
| 0001803 | 5/1979 | European Pat. Off. |
| 0063544 | 10/1982 | European Pat. Off. |
| 0177322 | 4/1986 | European Pat. Off. |
| 0351360 | 1/1990 | European Pat. Off. |
| 0468418 | 1/1992 | European Pat. Off. |

Primary Examiner—P. C. Sluby
Attorney, Agent, or Firm—Sughrue, Mion, Zinn, Macpeak & Seas

[57] ABSTRACT

An agricultural film comprising a thermoplastic resin film containing an ethylene copolymer with a hindered amine in its side chain and having coated thereon an anti-fogging agent comprising an inorganic hydrophilic colloidal substance and a hydrophilic organic compound and an anti-fogging agricultural film comprising a thermoplastic resin film containing an ethylene copolymer with a hindered amine in its side chain and, if desired, further containing a hydrotalcite compound, with an anti-fogging agent coated on the inside surface thereof or incorporated therein. The agricultural films have excellent weather resistance, anti-fogging properties, heat-retaining properties, and transparency.

19 Claims, 1 Drawing Sheet

AGRICULTURAL FILM

FIELD OF THE INVENTION

This invention relates to an agricultural film and, more particularly, to an agricultural film having excellent weather resistance, anti-fogging properties, heat-retaining properties, and transparency.

BACKGROUND OF THE INVENTION

Agricultural films which are largely used in greenhouse culture or tunnel culture chiefly include soft ethylene resin films which are about 30 to 200 μm thick and which comprise, as a base resin, polyvinyl chloride (hereinafter abbreviated as PVC), branched low-density polyethylene (hereinafter abbreviated as LDPE), ethylene-vinyl acetate copolymers (hereinafter abbreviated as EVA), linear low-density polyethylene (hereinafter abbreviated as LLDPE), etc. Of the various properties required for the agricultural films, particularly important are weather resistance, anti-fogging properties, heat-retaining properties, and transparency. To cope with the recent situation confronting agriculture such as an increased cost and a shortage of labor, development of films having an extended duration of life before replacement is desired.

Deterioration in elongation of agricultural films occurs through exposure to ultraviolet rays of sunlight in the presence of oxygen in the air and they break. In order to obtain good weathering, various proposals have so far been made to provide agricultural films having an extended use-life and improved performance properties against weathering. For example, various weathering stabilizers to be incorporated into plastic compounds have hitherto been proposed.

Weathering stabilizers can be roughly divided into ultraviolet absorbents and light stabilizers. In recent years, light stabilizers have taken the lead because they are more effective in thin agricultural films in improving weather resistance with a smaller amount, which leads to a reduction in cost.

While nickel-containing light stabilizers have conventionally been used, many hindered amine compounds have recently been proposed as light stabilizers and are now widely employed because they produce excellent effects at reduced amounts.

However, hindered amine light stabilizers generally have a small molecular weight and are readily released from the film, thus failing to retain their stabilizing effects for an extended period of time.

In addition, since hindered amine light stabilizers having excellent light stabilizing effects are alkaline, if they are brought into contact with insecticides used for extermination of harmful insects, such as chlorinated organic compounds and organophosphorus compounds, chemical reactions with acidic substances resulting from decomposition of these insecticidal compounds occur thereby weakening their effects as weathering stabilizers.

In order to overcome the above-described problem, use of hydrotalcite as a neutralizing agent in combination with hindered amine light stabilizers, is disclosed in JP-A-63-175072 (the term "JP-A" as used herein means an "unexamined published Japanese patent application"). However, the approach is not a completely satisfactory solution to the above-mentioned problem that the hindered amine light stabilizers are unavoidably released from the film because of their low molecular weight.

The atmosphere within greenhouses or tunnels surrounded by an agricultural film is saturated with water vapor which evaporates from the soil or plants, and the water vapor dropwise condenses on the inner surface of a cold film to cause fogging. Water droplets on the film not only greatly reduce the incident sunlight due to irregular reflection but the droplets fall on the plants resulting in frequent occurrence of diseases.

To avoid fogging, anti-fog treatments on the inner surface of an agricultural film converting the film into an anti-stick water film and preventing adhesion of water droplets have been used thereby assuring transmission of sunlight into the greenhouse or tunnel, raising the soil temperature and air temperature within the greenhouse or tunnel, accelerating photosynthesis of the plants, accelerating healthy growth of the plants, and controlling the occurrence of plant diseases.

Currently employed anti-fog treatments include incorporation of an anti-fogging agent (anti-fog additive) into a film-forming ethylene resin compound and coating of an anti-fogging agent on a film.

However, an anti-fogging film obtained by coating a soft plastic film with an anti-fogging agent has not yet been employed practically as an agricultural film for the following reasons. Because of their low surface energy, soft plastic films for agricultural use generally have poor wettability and adhesion when coated with surface active agents or hydrophilic high polymeric substances which have been used as anti-fogging agents. This tendency is particularly conspicuous with soft ethylene resin films of low polarity, e.g., LDPE, EVA, and LLDPE films. Therefore, where an anti-fogging agent is spray coated with a power atomizer onto a soft ethylene resin film, the anti-fogging agent needs to be used in a large quantity and this increases cost, and a large amount of time is required for spray coating operation. Further, spray coating cannot be effected uniformly with insufficient anti-fogging effects arising. Where an anti-fogging agent is applied using a coater, etc., a large quantity of a coating is consumed, and the coating speed cannot be increased, resulting in an increase of cost. In either case, the coated anti-fogging agent is washed away together with running water droplets due to poor adhesion resulting in a very short life for the anti-fogging properties. Furthermore, the coated film undergoes blocking due to the stickiness of the anti-fogging agent. As a result, it has been impossible to retain anti-fogging effects in a stable manner for a long duration of at least 1 year, more desirably, several years. Most of the state-of-the-art agricultural films exhibit anti-fogging properties for a period of only about 1 month.

Anti-fogging agents commonly incorporated into the films include nonionic, anionic and cationic surface active agents.

Other methods for providing anti-fogging properties to agricultural films, in addition to the coating method and incorporation method, include chemical modification of the ethylene base resin or the ethylene resin film surface by introducing a polar group, such as a hydrophilic group. This technique, however, entails high cost at the present time and is difficult to apply to agricultural films.

On the other hand, coating type anti-fogging agents mainly comprising an inorganic hydrophilic colloidal substance and a hydrophilic organic compound have recently been developed as disclosed, e.g., in JP-B-63-

45432, JP-B-63-45717, and JP-B-64-2158 (the term "JP-B" as used herein means an "examined published Japanese patent application"). Suitable inorganic hydrophilic colloidal substances include colloidal silica, colloidal alumina, colloidal $Fe(OH)_2$, colloidal $Sn(OH)_4$, colloidal $TiO_2$, colloidal $BaSO_4$, and colloidal lithium silicate, with colloidal silica and colloidal alumina most generally used. Suitable hydrophilic organic compounds include various nonionic, anionic or cationic surface active agents; graft copolymers mainly comprising a hydroxyl-containing vinyl monomer unit and from 0.1 to 40% by weight of a carboxyl-containing vinyl monomer unit or a partial or complete neutralization product thereof; and sulfo-containing polyester resins.

Coating type anti-fogging agents used with this new film type have markedly improved wettability and adhesion and coated agricultural films exhibiting anti-fogging properties for a duration of about a half year to about 1 year are provided.

The temperature in the greenhouse falls when the outside temperature falls at night, particularly at dawn. Taking an integrated temperature (daily mean air temperature × days; e.g., 2500° to 3000° C. in the case of rice plant) into consideration, a temperature difference of 1° or 2° C. at dawn greatly influences crop yield and harvest-time. Therefore, heat-retaining property is a particularly important characteristic of agricultural films.

Additives for imparting heat-retaining properties to agricultural films include fillers, such as silica powder (see JP-B-47-13853), magnesium compounds (see JP-B-3-50791), and hydrotalcite (see JP-B-62-31744), water-absorbing resins (see JP-A-61-81446), and ethylene-vinyl alcohol copolymers (see JP-A-55-118941). In particular, hydrotalcite is known to provide a satisfactory balance between heat-retaining properties and transparency in view of its heat retention effect and less impairment of transparency as compared with other inorganic fillers.

Transparency of agricultural films is essential for plants growing in the sun, and agricultural films preferably have as high transparency as possible.

Under these circumstances, none of the state-of-the-art polyolefin-based agricultural films satisfies all of the requirements of heat-retaining properties, transparency, weather resistance, and anti-fogging properties.

SUMMARY OF THE INVENTION

An object of the present invention is to provide an agricultural film with excellent anti-fogging properties which can be obtained by coating an anti-fogging agent on a base film easily and at low cost.

Another object of the present invention is to provide an agricultural film with excellent heat-retaining properties, transparency, weather resistance, and anti-fogging properties.

As a result of extensive investigations, it has now been found that a thermoplastic resin agricultural film containing an ethylene copolymer with a hindered amine in its side chain and, if desired, further containing a hydrotalcite compound, which has coated on the inside surface thereof with an anti-fogging agent or which has incorporated therein an anti-fogging agent has a longer weather resistance duration than those containing a conventional light stabilizer and exhibits excellent anti-fogging properties balance with good heat-retaining properties and transparency.

A first embodiment of the present invention provides an agricultural film comprising (A') a thermoplastic resin film containing an ethylene copolymer with a hindered amine in its side chain and which has coated thereon an anti-fogging agent mainly comprising an inorganic hydrophilic colloidal substance and a hydrophilic organic compound.

A second embodiment of the present invention provides an anti-fogging agricultural film comprising (A) a thermoplastic resin film containing (1) an ethylene copolymer with a hindered amine in its side chain which is obtained by copolymerizing ethylene and a cyclic aminovinyl compound in an amount such that film (A) contains from 0.05 to 5% by weight of a unit derived from the cyclic aminovinyl compound and (2) from 0.5 to 20% by weight of a hydrotalcite compound, with film (A) further having an anti-fogging agent coated thereon or incorporated therein.

A third embodiment of the present invention provides an agricultural laminate film composed of (A) a thermoplastic resin film containing (1) an ethylene copolymer with a hindered amine in its side chain which is obtained by copolymerizing ethylene and a cyclic aminovinyl compound in an amount such that film (A) contains from 0.05 to 5% by weight of a unit derived from the cyclic aminovinyl compound and (2) from 0.5 to 20% by weight of hydrotalcite compound as an outer layer and (B) an anti-fogging resin film as an inner layer.

A fourth embodiment of the present invention provides an agricultural laminate film composed of (A") a thermoplastic resin film as an outermost layer containing an ethylene copolymer with a hindered amine in its side chain which is obtained by copolymerizing ethylene and a cyclic aminovinyl compound in an amount such that film (A") contains from 0.05 to 5% by weight of a unit derived from the cyclic aminovinyl compound, and (C) a thermoplastic resin film as an innermost layer containing from 0.5 to 20% by weight of a hydrotalcite compound, with film (C) additionally having an anti-fogging agent coated thereon or incorporated therein.

A fifth embodiment of the present invention provides an agricultural laminate film composed of (A") a thermoplastic resin film as an outermost layer containing an ethylene copolymer with a hindered amine in its side chain which is obtained by copolymerizing ethylene and a cyclic aminovinyl compound in an amount such that film (A") contains from 0.05 to 5% by weight of a unit derived from said cyclic aminovinyl compound unit, (C') a thermoplastic resin film as an intermediate layer containing from 0.5 to 20% by weight of a hydrotalcite compound, and (B') an anti-fogging resin film as an innermost layer.

DETAILED DESCRIPTION OF THE INVENTION

Figure 1:
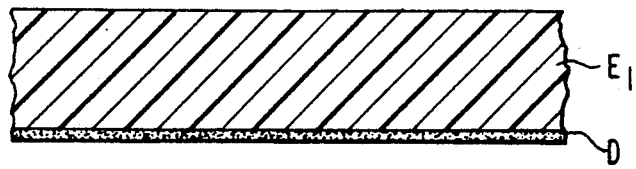
FIGS. 1, 2, 4, and 5 each illustrate a cross section of the agricultural film according to the present invention. In these figures, $E_1$ is a single-layer film, $E_3$ is a three-layer laminate film, D is an anti-fogging agent coat, and c, d and e each is a layer containing an ethylene copolymer with a hindered amine in the side chain thereof.

Suitable thermoplastic resins which can be used as a base film resin in the present invention advantageously include ethylene resins, e.g., LDPE, EVA, and LLDPE. These resins are commonly employed in quantity as agricultural films.

Ethylene copolymers with a hindered amine in its side chain which can be used in the present invention preferably include a copolymer of (a) ethylene and (b) a cyclic aminovinyl compound represented by formula (I):

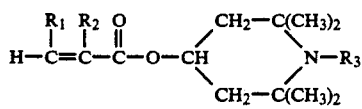

wherein $R_1$ and $R_2$, which may be the same or different, each represents a hydrogen atom or a methyl group; and $R_3$ represents a hydrogen atom or an alkyl group having from 1 to 4 carbon atoms.

The ethylene-vinyl compound copolymer preferably contains less than 1 mol %, more preferably from 0.1 to 0.7 mol %, of the vinyl compound unit (b) and a melt flow rate (MFR) of from 0.1 to 200 g/10 min. It is particularly preferable for at least 83 mol % of the vinyl compound unit (b) in the ethylene-vinyl compound copolymer to exist in isolation without being continuous.

The nature of the existence of the vinyl compound unit (b) in the ethylene-vinyl compound copolymer can be confirmed by $^{13}C$ NMR analysis as follows. $^{13}C$ NMR analysis is carried out, e.g., with a "Spectrometer JNM-CSX 270" manufactured by Japan Electron Optics Laboratory Co., Ltd. in a known manner, for example, by reference to KIKI BUNSEKI NO TEBIKI (I), pp. 53–56, Kagaku Dojin (1986) by using the chemical shifts of polyethyl acrylate described in KOBUNSHI BUNSEKI HANDBOOK. p. 969, Asakura Shoten (1985) and an ethylene-hydroxyethyl acrylate copolymer described in $Eur.\ Poly.\ J.$, Vol. 25, No. 4, pp. 411–418 (1989). The peaks at 32.9 ppm and 35.7 ppm (on a tetramethylsilane (TMS) standard) are assigned to a methylene group at the $\alpha$-position from the branching point of an isolated vinyl monomer unit (b) and a methylene group interposed between the branching points of two vinyl monomer units (b) connected to each other, respectively. The proportion of isolated vinyl monomer units (b) in the copolymer of ethylene (a) and vinyl monomer (b) can be calculated from these two signals according to the formula:

$$\frac{\text{Peak Area at 32.9 ppm}}{\text{Peak Area at 32.9 ppm + Peak Area at 35.7 ppm}}$$

Typical examples of vinyl compounds represented by formula (I) include:

1) 4-Acryloyloxy-2,2,6,6-tetramethylpiperidine
2) 4-Acryloyloxy-1,2,2,6,6-pentamethylpiperidine
3) 4-Acryloyloxy-1-ethyl-2,2,6,6-tetramethylpiperidine
4) 4-Acryloyloxy-1-propyl-2,2,6,6-tetramethylpiperidine
5) 4-Acryloyloxy-1-butyl-2,2,6,6-tetramethylpiperidine
6) 4-Methacryloyloxy-2,2,6,6-tetramethylpiperidine
7) 4-Methacryloyloxy-1,2,2,6,6-pentamethylpiperidine
8) 4-Methacryloyloxy-1-ethyl-2,2,6,6-tetramethylpiperidine
9) 4-Methacryloyloxy-1-butyl-2,2,6,6-tetramethylpiperidine
10) 4-Crotonoyloxy-2,2,6,6-tetramethylpiperidine
11) 4-Crotonoyloxy-1-propyl-2,2,6,6-tetramethylpiperidine The ethylene copolymer with a hindered amine in the side chain thereof can be prepared by high-pressure radical copolymerization as described in detail in U.S. patent application Ser. No. 07/729,686. More specifically, (a) ethylene and (b) a vinyl compound of the formula (I) are radical copolymerized at a temperature of from 100° to 400° C. under a pressure of from 1000 to 5000 kg/cm² to obtain a copolymer containing less than 1 mol % of vinyl compound unit (b) based on the total of units (a) and (b) and having an MFR of from 0.1 to 200 g/10 min, with at least 83 mol % of unit (b) being present in isolation without being continuous.

It is known in the art that the above-described ethylene copolymers with a hindered amine in the side chain thereof can be incorporated in polyolefin films as a weathering stabilizer as described, e.g., in JP-A-57-180616 and JP-B-63-2963.

The term "thermoplastic resin containing an ethylene copolymer with a hindered amine in its side chain" as used herein also includes a thermoplastic resin compounded with an ethylene copolymer having a high content of the vinyl compound (I) and a graft copolymer obtained by directly grafting a prescribed amount of the vinyl compound (I) to an ethylene resin.

In the first embodiment of the present invention, the thermoplastic resin film (A') preferably contains from 0.05 to 5.0% by weight, more preferably from 0.1 to 3.0% by weight, and most preferably from 0.1 to 1.0% by weight, of the vinyl compound unit (b). If the vinyl compound unit content is less than 0.05%, the effect of extending the duration of anti-fogging properties is decreased. If the amount exceeds 5.0%, no further effect of extending duration of anti-fogging properties occurs, but rather larger amounts adversely influence the anti-fogging properties in the initial use stage.

In the second to fifth embodiments of the present invention, the thermoplastic resin film (A) or (A") preferably contains from 0.05 to 5.0% by weight, and more preferably from 0.1 to 4% by weight, of the vinyl compound unit (b). If the vinyl compound unit content is less than 0.05%, the effect of improving weather resistance is insubstantial. Even if it exceeds 5.0%, no further improvements on weather resistance can be obtained, with the amount being uneconomical.

The ethylene copolymer with a hindered amine in its side chain may be uniformly distributed in a single-layer film or may be concentrated in the outermost layer (i.e., the side to be exposed to the weather) of a multi-layer laminate film. Since the effects of the copolymer on improving anti-fog duration and weatherability are enhanced as the concentration increases to some extent, preferably the agricultural film has a multi-layered structure with the copolymer being concentrated in its outermost layer.

Hydrotalcite compounds which can be used in the present invention include compounds represented by formula (II):

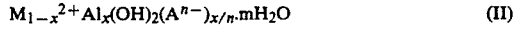

wherein $M^{2+}$ represents a divalent metal ion selected from $Mg^{++}$, $Ca^{++}$, and $Zn^{++}$; $A^{n-}$ represents an n-valent anion; and x and m represent numbers satisfying conditions: $0x < 0.5$ and $0 \leq m \leq 2$, and the calcined products thereof.

In formula (II), examples of n-valent anions for $A^{n-}$ include $Cl^-$, $Br^-$, $I^-$, $NO_3^{2-}$, $ClO_4^-$, $SO_4^{2-}$, $CO_3^{2-}$, $SiO_3^{2-}$, $HPO_4^{2-}$, $HBO_3^{2-}$, and $PO_4^{2-}$.

Specific examples of hydrotalcite compounds of formula (II) are DHT-4A, DHT-4SA, Alcamizer 1, and Alcamizer 2, all produced by Kyowa Chemical Industry Co., Ltd.

The hydrotalcite compound is used in an amount of from 0.5 to 20% by weight, and preferably from 1 to 10% by weight, based on the weight of the film. An average particle size of the hydrotalcite compound is not more than 5 μm, and preferably is from 0.05 to 2 μm. If the hydrotalcite content is less than 0.5%, the effect of improving weather resistance is weak. If the hydrotalcite compound is used in too a high amount or has an excessively large particle size, the film tends to have reduced strength or deteriorated transparency.

Where the hydrotalcite compound is incorporated into one layer or two or more layers, it is employed in a total amount of not more than 20% by weight based on the total resin content of the layers.

An anti-fogging agent can be incorporated into a single-layer thermoplastic resin film of the present invention or innermost layer (B), (C) or (B') of a multi-layer film of the present invention or coated on the inner surface of a single or multi-layer film. When incorporated, it is employed in an amount of from 0.1 to 5% by weight based on the weight of the single-layer film or innermost layer (B), (C) or (B'). If the amount is less than 0.1%, little anti-fogging effect arises. If the amount exceeds 5%, the film surface becomes sticky, easily collecting dust with transparency being reduced.

Generally employed anti-fogging agents, such as nonionic, anionic or cationic surface active agents, can be incorporated into a film or a film layer. Specific examples of suitable anti-fogging agents to be incorporated are poly(ethylene oxide adduct of lauryl alcohol), poly(ethylene oxide adduct of stearyl alcohol), poly(ethylene oxide adduct of nonylphenyl alcohol), polyethylene glycol monopalmitate, polyethylene glycol monostearate, polyoxyethylene sorbitan monolaurate, polyoxyethylene sorbitan monopalmitate, glycerin monolaurate, glycerin monopalmitate, glycerin monostearate, glycerin distearate, glycerin monooleate, pentaerythritol monolaurate, sorbitan monopalmitate, sorbitan monobehenate, sorbitan distearate, diglycerin monooleate, triglycerin dioleate, sodium lauryl sulfate, sodium dodecylbenzenesulfonate, sodium butylnaphthalenesulfonate, cetyltrimethylammonium chloride, an alkyldimethylbenzylammonium chloride, dodecylamine hydrochloride, lauric acid laurylamidoethyl phosphate, triethylcetylammonium iodide, oleylaminodiethylamine hydrochloride, and basic pyridinium salts, e.g., dodecylpyridinium sulfate.

Preferred agents are nonionic surface active agents mainly comprising an ester between a fatty acid having from 14 to 22 carbon atoms, e.g., stearic acid, palmitic acid, valeric acid, lauric acid and so on, and a polyhydric alcohol, e.g., sorbitan, sorbitol, glycerin, polyglycerin, polyethylene glycol, and polypropylene glycol, or an alkylene oxide adduct of such an ester. For example, poly(ethylene oxide adduct of lauryl alcohol), poly(ethylene oxide adduct of oleyl alcohol), glyceride of stearic acid are preferably used.

The anti-fogging agents to be coated include those mainly comprising an inorganic hydrophilic colloidal substance and a hydrophilic organic compound. Specific examples of such anti-fogging agents are described, e.g., in JP-B-63-45432, JP-B-63-45717, and JP-B-64-2158.

Examples of suitable inorganic hydrophilic colloidal substances include colloidal silica, colloidal alumina, colloidal $Fe(OH)_2$, colloidal $Sn(OH)_4$, colloidal $TiO_2$, colloidal $BaSO_4$, and colloidal lithium silicate, with colloidal silica and colloidal alumina being preferred.

Examples of suitable hydrophilic organic compounds include various nonionic, anionic or cationic surface active agents; copolymers containing from 0.1 to 40% by weight of a hydroxyl-containing vinyl monomer unit or a partial or complete neutralization product thereof; and sulfo-containing polyester resins. Suitable hydroxyl-containing vinyl monomers include 2-hydroxyethyl acrylate, 2-hydroxypropyl acrylate, and 2-hydroxyethyl methacrylate. Vinyl monomers copolymerizable with such hydroxyl-containing vinyl monomers include alkyl acrylates, alkyl methacrylates, styrene, acrylonitrile, and acrylic acid.

These anti-fogging agents are coated on the inner surface of a film in a coating amount of from 0.05 to 5 g/m$^2$, and preferably from 0.1 to 2 g/m$^2$. If the amount is less than 0.05 g/m$^2$, the duration of anti-fogging properties is short. If the amount exceeds 5 g/m$^2$, the transparency of the film is impaired.

Suitable coating methods which can be used are not particularly limited and include various roll coating, dip coating, and spray coating techniques. Coating may be carried out by in-line coating (subsequently to film formation) or off-line coating (during an unwinding step subsequent to film formation), or by spray-coating subsequently to setting up of a film in the location of use.

From the standpoint of duration of anti-fogging effects, the anti-fog treatment by coating is preferable to the treatment by incorporation.

The agricultural film according to the present invention has a total thickness of from 0.03 to 0.3 mm, and preferably from 0.05 to 0.2 mm. Too thin film results in a decrease in strength, and too a thick film is uneconomical.

According to the first embodiment of the present invention, if desired, various additives such as 0.01 to 0.5% by weight of stabilizers, 0.01 to 0.3% by weight of lubricants, 0.5 to 5% by weight of colorants, 0.5 to 20% by weight of heat-retaining agents (e.g., hydrotalcite, borosilicate glass, phosphosilicate glass), and other inorganic powders may be added to the compound of film.

A single- or multi-layer film can be obtained by any method, generally by blown-film extrusion, T-die extrusion, calendering, and the like. In the case of multi-layer films, the thickness of the outermost layer containing the ethylene copolymer with a hindered amine in the side chain preferably ranges from about 5 to 20 μm with film forming properties, thickness precision, and cost of the film being taken into consideration.

If desired, the surface of the film to be coated with an anti-fogging agent may be subjected to a corona discharge treatment (20 to 30 W·min/m$^2$) to enhance the effect of extending the duration of anti-fogging properties.

The agricultural film according to the second and third embodiments of the present invention includes a single layer film and a multi-layer laminate film. The multi-layer film may have a two-layer structure comprising (A) a thermoplastic resin film containing the ethylene copolymer with a hindered amine in its side chain and a hydrotalcite compound and (B) an anti-fogging resin film as an inner layer or a three- or more-layer structure comprising at least film (A), an intermediate layer, and film (B). It is preferable that film (A) serves as an outer layer or an intermediate layer while film (B) serves as an inner layer.

In a two-layer laminate film, film (A) has a thickness of from 5 to 250 μm, and film (B) has a thickness of from 5 to 250 μm. In a three-layer laminate film, film (A), the intermediate film, and film (B) have a thickness of from 5 to 200 μm, from 5 to 200 μm, and from 5 to 50 μm, respectively.

In the fourth and fifth embodiments of the present invention, the ethylene copolymer with a hindered amine in its side chain and a hydrotalcite compound are incorporated into separate layers. This layer structure has a somewhat higher transparency than in a laminate film containing both of these components in the outermost layer (A'').

Figure 4:
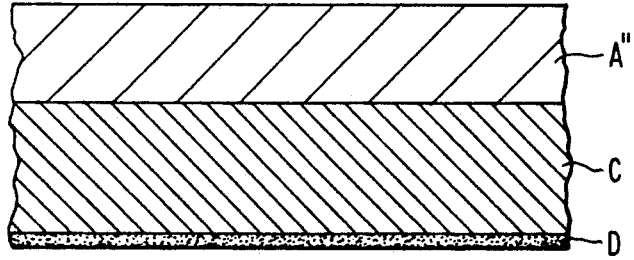

The agricultural laminate film may have a two-layer structure comprising a thermoplastic resin film (A'') as an outer layer containing the ethylene copolymer with a hindered amine in its side chain and an anti-fogging resin film (C) as an inner layer containing a hydrotalcite compound as shown in FIG. 4, or may have a three-layer structure further having an intermediate layer between (A'') and (C).

Figure 5:
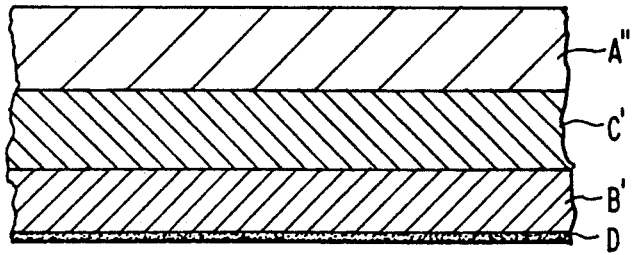

The agricultural laminate film may also have a three-layer structure composed of (A'')/hydrotalcite-containing intermediate layer (C')/anti-fogging resin film (B') as an inner layer (in this case, layer (B') contains no hydrotalcite) as shown in FIG. 5 or a four-layer structure composed of (A'')/intermediate layer/(C')/(B').

In the case of the two-layer laminate film (A''/C), outer layer (A'') has a thickness of from 5 to 250 μm, and preferably from 15 to 100 μm, and inner layer (C) has a thickness of from 5 to 250 μm. In the case of the three-layer laminate film, outermost layer (A''), intermediate layer, and innermost layer (C), (C') or (B') have a thickness of from 5 to 200 μm, from 5 to 200 μm, and from 5 to 50 μm, respectively.

If desired, the agricultural films according to the present invention may contain various additives, such as waxes, antioxidants, antistatic agents, ultraviolet absorbents, lubricants, and inorganic fillers.

In the first embodiment, since the single-layer thermoplastic resin film previously contains the above-described specific ethylene copolymer, it appears that the surface characteristics of the film have undergone great changes due to chemical and electrostatic interactions of the hindered amine in the ethylene copolymer. The actual mechanism by which the specific ethylene copolymer incorporated into the film provides improvements in receptivity to coated anti-fogging agents and anti-fogging properties of the coated film has not yet been elucidated. While not desiring to be bound, it is believed that the ethylene copolymer gives the film surface with a certain polarity resulting in considerable changes in chemical and electrostatic characteristics. As a result, the thermoplastic resin film has improved wettability with an anti-fogging agent on coating as well as improved adhesion to the coated anti-fogging agent, thereby achieving uniform and even coating of the anti-fogging agent using a reasonable amount of the anti-fogging agent in a reasonable time, leading to reduction in cost.

Further, the anti-fogging agent can be uniformly coated and very firmly adhered onto the film surface.

The present invention is now illustrated in greater detail with reference to the following Examples, but it should be understood that the present invention is not to be construed to be limited thereto. All percents, parts, and ratios and the like are by weight unless otherwise indicated.

EXAMPLES 1 TO 15 AND COMPARATIVE EXAMPLES 1 AND 2

1) Preparation of Ethylene Copolymer A

In a stirring type autoclave for continuous reaction were continuously fed ethylene, 4-acryloyloxy-2,2,6,6-tetramethylpiperidine dissolved in ethyl acetate, and, as a catalyst, t-butyl peroxypivalate dissolved in n-hexane, and a copolymerization reaction was conducted at a temperature of 200° C. and a pressure of 2000 kg/cm². The resulting copolymer (designated Ethylene Copolymer A) had an MFR of 2.7 g/10 min and a 4-acryloyloxy-2,2,6,6-tetramethylpiperidine content of 7.0% (0.99 mol %).

2) Preparation of Ethylene Copolymer B

Ethylene Copolymer B was prepared in the same manner as Ethylene Copolymer A, except for replacing 4-acryloyloxy-2,2,6,6-tetramethylpiperidine with 4-acryloyloxy-1,2,2,6,6-pentamethylpiperidine. Ethylene Copolymer B had an MFR of 2.0 g/10 min and a 4-acryloyloxy-1,2,2,6,6-pentamethylpiperidine content of 7.0%.

3) Preparation of Ethylene Copolymer C

Ethylene Copolymer C was prepared in the same manner as Ethylene Copolymer A, except for replacing 4-acryloyloxy-2,2,6,6-tetramethylpiperidine with 4-acryloyloxy-1-butyl-2,2,6,6-tetramethylpiperidine. The feed rate of the ethyl acetate solution of the vinyl compound was minutely controlled so that the resulting copolymer had a vinyl compound content of 7.0%. Ethylene Copolymer C had an MFR of 2.5 g/10 min and a 4-acryloyloxy-1-butyl-2,2,6,6-tetramethylpiperidine content of 7.0%.

4) Preparation of Base Film

LDPE (MFR: 1.0 g/10 min; density: 0.920 g/cm³) was compounded with pellets of Ethylene Copolymer A, B or C in a mixing ratio such that the resulting mixture had the vinyl compound unit content shown in Table 1 below, and the resulting compound was molded by blown-film extrusion in a conventional manner to obtain a 100 μm thick and 1800 mm wide single-layer Film E₁ shown in FIG. 1 (Samples 1 to 13).

For comparison, a single-layer Film E₁ was prepared in the same manner as for Samples 1 to 13, except for using LDPE alone or LDPE compounded with a commercially available hindered amine weather stabilizer "Tinubin 622" produced by Ciba-Geigy (Samples 1' and 2').

Figure 2:
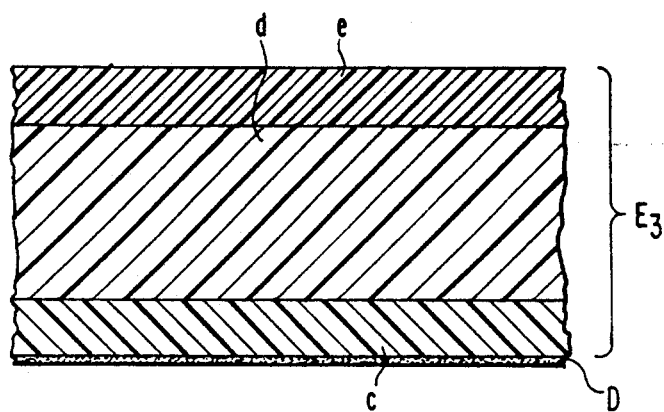

Further, a 100 μm thick and 1800 mm wide three-layer laminated Film E₃ composed of 15 μm thick layer c as an inner layer, 70 μm thick layer d as an intermediate layer, and 15 μm thick layer d as an outer layer as shown in FIG. 2 (Samples 14 and 15) was prepared by blown-film extrusion in a usual manner. Layers c and e comprised Ethylene Copolymer A and the same LDPE as used above and had the vinyl compound unit content shown in Table 2 below, and layer d comprised Ethylene Copolymer A, the same LDPE as used above and borosilicate glass powder mainly comprising silicon dioxide ($SiO_2$) and boron oxide ($B_2O_3$) and had the vinyl compound unit content and the borosilicate glass powder content shown in Table 2. In FIGS. 1 and 2, layer D indicates an anti-fogging agent coat hereinafter described.

TABLE 1

| Sample No. | Ethylene Copolymer | Vinyl Compound Unit Content in Film $E_1$ (wt %) | Tinubin 622 Content (wt %) |
|---|---|---|---|
| 1 | A | 0.05 | — |
| 2 | A | 0.1 | — |
| 3 | A | 0.5 | — |
| 4 | A | 1.0 | — |
| 5 | A | 3.0 | — |
| 6 | B | 0.05 | — |
| 7 | B | 0.1 | — |
| 8 | B | 0.5 | — |
| 9 | B | 1.0 | — |
| 10 | B | 3.0 | — |
| 11 | C | 0.05 | — |
| 12 | C | 0.5 | — |
| 13 | C | 3.0 | — |
| 1' | — | — | — |
| 2' | — | — | 0.5 |

TABLE 2

| Sample No. | Vinyl Compound Unit Content in Film $E_3$ (c/d/e) (wt %) | Borosilicate Glass Content (c/d/e) (wt %) |
|---|---|---|
| 14 | 0.5/0.05/0.05 | —/10.0/— |
| 15 | 3.0/0.05/0.05 | —/10.0/— |

5) Coating of Anti-Fogging Agent

An anti-fogging agent having the following formulation was coated on the inner surface of each of Samples 1 to 15 and Comparative Samples 1' and 2' by means of a brush roll coater having a roll width of 2000 mm at a variable coating speed.

| Anti-Fogging Agent Formulation: | |
|---|---|
| (a) Polymer A* | 100 parts |
| (b) Colloidal Silica (dispersed in alcohol ("Methanol Silica" produced by Nissan Chemical Co., Ltd.)) | 35 parts |
| *Polymer A is a compound obtained by reacting the following components (e) to (h) at 60° C. for 5 hours and neutralizing the product with 20% aqueous ammonia. | |
| (c) Poly(ethylene oxide adduct of lauryl alcohol) (surface active agent) | 15 parts |
| (d) Methanol | 450 parts |
| (e) 2-Hydroxyethyl Acrylate | 99 parts |
| (f) Acrylic Acid | 1 part |
| (g) Azobisisobutyronitrile (catalyst) | 0.5 part |
| (h) Methanol | 200 parts |

6) Evaluation

The coating properties of the base film and anti-fogging properties of the resulting coated films were evaluated according to the test methods described below.

The results of the tests on coating properties and anti-fogging properties are shown in Tables 3 and 4, respectively.

i) Coating Properties:

Coating properties at a variable coating speed were evaluated by visually observing unevenness of coating during coating based on the following rating system. The anti-fogging agent was dried in hot air.

Good No unevenness was observed during coating.

Medium Slight unevenness was observed during coating.

Figure 3:
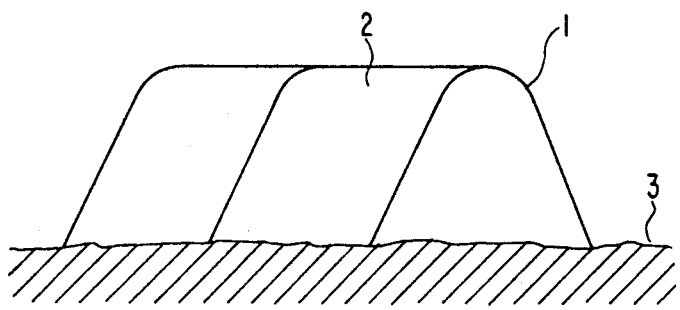
FIG. 3 illustrates a perspective view of an agricultural tunnel set up on a field with the agricultural film of the present invention.

Bad Considerable unevenness was observed during coating.

ii) Anti-Fogging Properties:

Coating of the anti-fogging agent was carried out at a coating speed of 8 m/min. The coated film was set up on a field to form a small-scale greenhouse having a height of 60 cm and a length of 1.5 m as illustrated in FIG. 3, and the state of water droplets adhering on the inner surface of the film was observed with time and evaluated based on the following rating system.

Good No water droplets adhered on the inner surface at all (all droplets were running down).

Medium Water droplets adhered on about 50% of the inner surface area.

Bad Water droplets adhered on the entire inner surface area.

"Good to medium" means midway between "good" and "medium", and "medium to bad" means midway between "medium" and "bad".

TABLE 3

| Sample No. | Coating Speed (m/min) | | | | | |
|---|---|---|---|---|---|---|
| | 5 | 10 | 15 | 20 | 30 | 40 |
| 1 | good | good | good | good to medium | medium | medium |
| 2 | good | good | good | good | good to medium | good to medium |
| 3 | good | good | good | good | good | good to medium |
| 4 | good | good | good | good | good | good |
| 5 | good | good | good | good | good | good |
| 6 | good | good | good | good to medium | medium | medium |
| 7 | good | good | good | good | good to medium | good to medium |
| 8 | good | good | good | good | good | good to medium |
| 9 | good | good | good | good | good | good |
| 10 | good | good | good | good | good | good |
| 11 | good | good | good | good to medium | medium | medium |
| 12 | good | good | good | good | good to medium | good to medium |
| 13 | good | good | good | good | good | good |
| 14 | good | good | good | good | good | good to medium |
| 15 | good | good | good | good | good | good |
| 1' | good | medium | bad | bad | bad | bad |
| 2' | good | good | good to medium | medium | bad | bad |

TABLE 4

| Sample No. | Time of Observation (months) | | | | | | | |
|---|---|---|---|---|---|---|---|---|
| | 6 | 12 | 18 | 24 | 30 | 36 | 42 | 48 |
| 1 | good | good | good | good to medium | medium | bad | — | — |
| 2 | good | good | good | good | good | good to medium | medium | bad |
| 3 | good | good | good | good | good | good | good | good to medium |
| 4 | good | good | good | good | good | good | good | good |
| 5 | good | good | good | good | good | good | good | good |
| 6 | good | good | good | good to medium | medium | bad | — | — |
| 7 | good | good | good | good | good | good to medium | medium | bad |
| 8 | good | good | good | good | good | good | good | good to medium |
| 9 | good | good | good | good | good | good | good | good |
| 10 | good | good | good | good | good | good | good | good |
| 11 | good | good | good | good to medium | medium | bad | — | — |
| 12 | good | good | good | good | good | good | good | good to medium |
| 13 | good | good | good | good | good | good | good | good |
| 14 | good | good | good | good | good | good | good | good to medium |
| 15 | good | good | good | good | good | good | good | good |
| 1' | good | medium | bad | — | — | — | — | — |
| 2' | good | good to medium | bad | — | — | — | — | — |

As is apparent from the results in Tables 3 and 4 above, the base films according to the present invention can be coated with the anti-fogging formulation at a coating speed of from 20 to 40 m/min, whereas the comparative films should be coated at a coating speed of 15 m/min at the highest, indicating the superiority of the films of the present invention in coating properties. Further, the coated films of the present invention show an anti-fog duration of from 2 to 4 years and possibly even longer, whereas the comparative films has a short anti-fog duration of about 1 year, indicating the marked superiority of the films of the present invention in anti-fog durability.

Then, each of Samples 3, 4, 9, and 15 and Comparative Samples 1' and 2' each having a thickness of 100 μm and a width of 600 cm was set up to form a greenhouse having a width of 5.4 m, a height of 2.8 m, and a length of 25 m. An anti-fogging agent having the following formulation was spray-coated on the inner surface of the set up film by means of a power atomizer, and the coating properties and anti-fogging properties were evaluated according to the following test methods. The results obtained are shown in Table 5 below.

| Anti-Fogging Agent Formulation: | | |
|---|---|---|
| (a) | Colloidal Silica ("Cataloid SI-35" produced by Shokubai Kasei K.K.) | 70% |
| (b) | γ-Ureidopropyltriethoxysilan | 5% |
| (c) | Poly(ethylene oxide (7 mol) adduct of oleyl alcohol) (nonionic surface active agent) | 25% |

Water was added to the mixture of the above components (a), (b), and (c) and mixed with stirring to prepare an anti-fogging agent formulation having an active ingredient concentration of 2%.

i) Coating Properties:

The coating properties were evaluated from the time required for spray coating and the amount of the anti-fogging agent used, i.e., a coated area per liter of anti-fogging agent.

ii) Anti-Fogging Properties:

After the coated film was thoroughly dried by opening the side of the greenhouse all day long, the greenhouse was closed, and the condition of water droplets adhering on the inner side of the film was visually observed and evaluated according to the following rating system.

Good No unevenness of coating, satisfactory anti-fogging properties.

Medium Slight unevenness of coating, slightly poor anti-fogging properties (water droplets were observed adhering to 5 to 10% of the total inner surface area).

Bad Unevenness of coating, poor anti-fogging properties (water droplets were observed adhering to 20 to 30% of the total inner surface area).

TABLE 5

| Sample No. | Coating Time (min) | Coated Area (m²/l) | Anti-Fogging Properties |
|---|---|---|---|
| 3 | ca. 16 | ca. 3.7 | good to medium |
| 4 | ca. 13 | ca. 4.0 | good |
| 9 | ca. 13 | ca. 4.0 | good |
| 15 | ca. 12 | ca. 4.2 | good |

TABLE 5-continued

| Sample No. | Coating Time (min) | Coated Area (m²/l) | Anti-Fogging Properties |
|---|---|---|---|
| 1' | ca. 30 | ca. 2.0 | medium to bad |
| 2' | ca. 23 | ca. 2.6 | medium |

As can be seen from the results in Table 5 above, the spray coating of the anti-fogging agent on the base films according to the present invention can be accomplished in a period reduced to about half that required for the comparative films, and the coated area per unit volume of the anti-fogging agent is about 1.5 times larger for the films of the present invention than for the comparative films. It can also be seen that the thus coated films of the present invention have very excellent anti-fogging properties in the initial stage of use.

In the following Examples and Comparative Examples, weather resistance, anti-fogging properties, heat-retaining properties, and transparency of agricultural films prepared were determined according to the test methods described below:

i) Weather Resistance:

A sample film was set up to form a small-scale greenhouse having a height of 60 cm and a length of 1.5 m, and test samples were punched out of the film by a punch cutter along the width direction. Elongation at break was obtained with a Schopper tensile tester according to the following equation, and the time when the elongation at break became 100% was taken as the end point of weather resistance duration.

$$\text{Elongation at Break (\%)} = \frac{\text{Distance between Two Gage Marks at Break (mm)} - \text{Distance between Two Gate Marks before Pulling (mm)}}{\text{Distance between Two Gage Marks before Pulling (mm)}} \times 100$$

ii) Anti-Fogging Properties:

A sample film was set up in the same manner as described above, and the change in the condition of water droplets adhering to the inner surface of the film was observed. The time when water droplets adhered to about 50% of the inner surface area was taken as an end point of anti-fog duration.

iii) Heat-Retaining Properties:

A sample film was set up in the same manner as described above, and the difference in temperature between the outside and inside of the greenhouse at 4:00 A.M. was measured. Measurements were taken for 10 consecutive days to obtain an average.

iv) Transparency:

Total light transmission (%) of a sample film was measured according to JIS K6714.

EXAMPLE 16

1) Preparation of Ethylene Copolymer D

In a stirring type autoclave for continuous reaction were continuously fed ethylene, 4-acryloyloxy-2,2,6,6-tetramethylpiperidine dissolved in ethyl acetate, and, as a catalyst, t-butyl peroxypivalate dissolved in n-hexane, and a copolymerization reaction was conducted at a temperature of 200° C. and a pressure of 2000 kg/cm² to obtain an ethylene copolymer with a hindered amine in the side chain thereof (designated Ethylene Copolymer D). Ethylene Copolymer D had an MFR of 2.7 g/10 min. The 4-acryloyloxy-2,2,6,6-tetramethylpiperidine content of Ethylene Copolymer D was 3.0% (0.41 mol %), 85% of which was found isolated by $^{13}$C-NMR analysis.

2) Preparation of Base Film

A 100 μm thick (total) and 1800 mm long three-layer laminate film having the layer structure shown in Table 6 below was prepared by blown-film extrusion by using an ethylene-vinyl acetate copolymer having a vinyl acetate content of 3% (hereinafter abbreviated as EVA 3) or an ethylene-vinyl acetate copolymer having a vinyl acetate content of 15% (hereinafter abbreviated as EVA 15) as a base resin with which Ethylene Copolymer D or hydrotalcite "DHT-4A" (produced by Kyowa Chemical Industry Co., Ltd.; average particle size: 0.4 μm) had been compounded.

3) Coating of Anti-Fogging Agent

The inner layer of the laminate film was coated with an anti-fogging agent having the following formulation by means of a brush roll coater having a roll width of 2000 mm at a coating speed of 8 m/min.

| Anti-Fogging Agent Formulation: | |
|---|---|
| (a) Colloidal Silica ("Cataloid SI-35") | 70% |
| (b) γ-Ureidopropyltriethoxysilane | 5% |
| (c) Poly(ethylene oxide (7 mol) adduct of oleyl alcohol) (nonionic surface active agent) | 25L% |

Water was added to the mixture of the above components (a), (b), and (c) and mixed with stirring to prepare an anti-fogging composition having an active ingredient concentration of 2%.

4) Evaluation

Weather resistance, anti-fogging properties, heat-retaining properties, and transparency of the resulting coated film were evaluated according to the above-described test methods. The results obtained are shown in Table 6.

EXAMPLE 17

A three-layer laminate film was prepared in the same manner as in Example 16, except for increasing the proportion of Ethylene Copolymer D in the outer and inner layers of the film. The results of the evaluations are shown in Table 6 below.

TABLE 6

| | Example 16 | | | Example 17 | | |
|---|---|---|---|---|---|---|
| | Outer Layer | Intermediate Layer | Inner Layer | Outer Layer | Intermediate Layer | Inner Layer |
| Thickness (μm) | 15 | 70 | 15 | 15 | 70 | 15 |
| Formulation (%): | | | | | | |
| EVA 3 | 90.0 | — | 90.0 | 50.0 | — | 50.0 |

TABLE 6-continued

|  | Example 16 | | | Example 17 | | |
| --- | --- | --- | --- | --- | --- | --- |
|  | Outer Layer | Inter-mediate Layer | Inner Layer | Outer Layer | Inter-mediate Layer | Inner Layer |
| EVA 15 | — | 92.6 | — | — | 92.6 | — |
| Ethylene Copolymer D | 10.0 | 1.7 | 10.0 | 50.0 | 1.7 | 50.0 |
| Vinyl Compound Content in Layer (%) | (0.3) | (0.05) | (0.3) | (1.5) | (0.05) | (1.5) |
| DHT-4A | — | 5.7 | — | — | 5.7 | — |
| Anti-Fogging Agent | — | — | coated | — | — | coated |
| Performance Properties: | | | | | | |
| Weather Resistance (month) |  | 48 |  |  | 60 |  |
| Anti-Fogging Properties (month) |  | 40 |  |  | 50 |  |
| Heat-Retaining Properties (°C.) |  | 1.3 |  |  | 1.3 |  |
| Total Light Transmission (%) |  | 92 |  |  | 91 |  |

EXAMPLE 18

A three-layer laminate film was prepared in the same manner as in Example 16, except for decreasing the proportion of Ethylene Copolymer D in the outer and inner layers of the film. The results of the evaluations are shown in Table 7 below.

EXAMPLE 19

A three-layer laminate film was prepared in the same manner as in Example 16, except for increasing the amount of hydrotalcite "DHT-4A" in the intermediate layer of the film. The results of the evaluations are shown in Table 7 below.

EXAMPLE 20

A three-layer laminate film was prepared in the same manner as in Example 16, except for decreasing the amount of hydrotalcite "DHT-4A" in the intermediate layer of the film. The results of the evaluations are shown in Table 8 below.

EXAMPLE 21

A three-layer laminate film was prepared in the same manner as in Example 16, except that no anti-fogging agent was coated and, instead, an anti-fog additive (poly(ethylene oxide adduct of lauryl alcohol)) was incorporated in the inner layer. The results of the evaluations are shown in Table 8 below.

TABLE 7

|  | Example 18 | | | Example 19 | | |
| --- | --- | --- | --- | --- | --- | --- |
|  | Outer Layer | Inter-mediate Layer | Inner Layer | Outer Layer | Inter-mediate Layer | Inner Layer |
| Thickness (m) | 15 | 70 | 15 | 15 | 70 | 15 |
| Formulation (%): | | | | | | |
| EVA 3 | 95.0 | — | 95.0 | 90.0 | — | 90.0 |
| EVA 15 | — | 92.6 | — | — | 87.8 | — |
| Ethylene Copolymer D | 5.0 | 1.7 | 5.0 | 10.0 | 1.7 | 10.0 |
| Vinyl Compound Content (%) | (0.15) | (0.05) | (0.15) | (0.3) | (0.05) | (0.3) |
| DHT-4A | — | 5.7 | — | — | 10.5 | — |
| Anti-Fogging Agent | — | — | coated | — | — | coated |
| Performance Properties: | | | | | | |
| Weather Resistance (month) |  | 24 |  |  | 48 |  |
| Anti-Fogging Properties (month) |  | 40 |  |  | 40 |  |
| Heat-Retaining Properties (°C.) |  | 1.3 |  |  | 1.6 |  |
| Total Light Transmission (%) |  | 91 |  |  | 85 |  | ations are shown in Table 8 below.

TABLE 8

|  | Example 20 | | | Example 21 | | |
| --- | --- | --- | --- | --- | --- | --- |
|  | Outer Layer | Inter-mediate Layer | Inner Layer | Outer Layer | Inter-mediate Layer | Inner Layer |
| Thickness (m) | 15 | 70 | 15 | 15 | 70 | 15 |
| Formulation (%): | | | | | | |
| EVA 3 | 90.0 | — | 90.0 | 90.0 | — | 89.0 |

TABLE 8-continued

|  | Example 20 | | | Example 21 | | |
| --- | --- | --- | --- | --- | --- | --- |
|  | Outer Layer | Intermediate Layer | Inner Layer | Outer Layer | Intermediate Layer | Inner Layer |
| EVA 15 | — | 97.6 | — | — | 92.6 | — |
| Ethylene Copolymer D | 10.0 | 1.7 | 10.0 | 10.0 | 1.7 | 10.0 |
| Vinyl Compound Content (%) | (0.3) | (0.05) | (0.3) | (0.3) | (0.05) | (0.3) |
| DHT-4A | — | 0.7 | — | — | 5.7 | — |
| Anti-Fogging Agent for Incorporation | — | — | — | — | — | 1.0 |
| Anti-Fogging Agent for Coating | — | — | coated | — | — | — |
| Performance Properties: | | | | | | |
| Weather Resistance (month) | | 48 | | | 48 | |
| Anti-Fogging Properties (month) | | 40 | | | 18 | |
| Heat-Retaining Properties (°C.) | | 1.0 | | | 1.2 | |
| Total Light Transmission (%) | | 92 | | | 89 | |

EXAMPLE 22

A 100 μm thick and 1800 mm wide single-layer film was prepared from a mixture of an ethylene-vinyl acetate copolymer having a vinyl acetate content of 13% (hereinafter abbreviated as EVA 13), ethylene copolymer D, and hydrotalcite "DHT-4A" according to the formulation shown in Table 9 below by blown-film extrusion, and the film was coated with the same anti-fogging agent as used in Example 16 in the same manner as in Example 16. The results of evaluations are shown in Table 9 below.

EXAMPLE 23

A single-layer film was prepared in the same manner as in Example 22, except no anti-fogging agent was coated and, instead, an anti-fog additive (poly(ethylene oxide adduct of lauryl alcohol)) was incorporated in the film. The results of the evaluations are shown in Table 9 below.

TABLE 9

|  | Example 22 | Example 23 |
| --- | --- | --- |
| Thickness (μm) | 100 | 100 |
| Formulation (%): | | |
| EVA 13 | 86.0 | 85.0 |
| Ethylene Copolymer D | 10.0 | 10.0 |
| Vinyl Compound Content (%) | (0.3) | (0.3) |
| DHT-4A | 4.0 | 4.0 |
| Anti-Fogging Agent for Incorporation | — | 1.0 |
| Anti-Fogging Agent for Coating | coated | — |
| Performance Properties: | | |
| Weather Resistance (month) | 45 | 45 |
| Anti-Fogging Properties (month) | 40 | 18 |
| Heat-Retaining Properties (°C.) | 1.3 | 1.2 |
| Total Light Transmission (%) | 93 | 90 |

EXAMPLE 24

A three-layer laminate film was prepared in the same manner as in Example 16, except for decreasing the amount of hydrotalcite "DHT-4A" in the intermediate layer of the film. The results of the evaluations are shown in Table 10 below.

TABLE 10

|  | Example 24 | | |
| --- | --- | --- | --- |
|  | Outer Layer | Intermediate Layer | Inner Layer |
| Thickness (μm) | 15 | 70 | 15 |
| Formulation (%): | | | |
| EVA 3 | 90.0 | — | 90.0 |
| EA 15 | — | 98.16 | — |
| Ethylene Copolymer D | 10.0 | 1.7 | 10.0 |
| Vinyl Compound Content (%) | (0.3) | (0.05) | (0.3) |
| DHT-4A | — | 0.14 | — |
| Anti-Fogging Agent for Coating | — | — | coated |
| Performance Properties: | | | |
| Weather Resistance (month) | | 48 | |
| Anti-Fogging Properties (month) | | 40 | |
| Heat-Retaining Properties (°C.) | | 0.5 | |
| Total Light Transmission (%) | | 92 | |

COMPARATIVE EXAMPLE 3

A three-layer laminate film was prepared in the same manner as in Example 16, except for replacing Ethylene Copolymer D in which 85 mol % of the vinyl compound unit existed in isolation with an ethylene copolymer with a hindered amine in its side chain in which 76 mol % of the vinyl compound unit existed in isolation. The results of the evaluations are shown in Table 11 below.

COMPARATIVE EXAMPLE 4

A 100 μm thick single-layer film was prepared solely from EVA 13, and heat-retaining properties and transparency were evaluated for comparison. The results obtained are shown in Table 11 below.

TABLE 11

| | Comparative Example 3 | | | Comparative Example 4 (single layer) |
|---|---|---|---|---|
| | Outer Layer | Intermediate Layer | Inner Layer | |
| Thickness (μm) | 15 | 70 | 15 | 100 |
| Formulation (%): | | | | |
| EVA 3 | 90.0 | — | 90.0 | — |
| EVA 13 | — | — | — | 100 |
| EVA 15 | — | 92.6 | — | — |
| Ethylene Copolymer* | 10.0 | 1.7 | 10.0 | — |
| Vinyl Compound Content (%) | (0.3) | (0.05) | (0.3) | — |
| DHT-4A | — | 5.7 | — | — |
| Anti-Fogging Agent for Coating | — | — | coated | — |
| Performance Properties: | | | | |
| Weather Resistance (month) | | 14 | | — |
| Anti-Fogging Properties (month) | | 40 | | — |
| Heat-Retaining Properties (°C.) | | 1.3 | | 0.4 |
| Total Light Transmission (%) | | 92 | | 95 |

Note: *Ethylene copolymer with a hindered amine in the side chain thereof having a vinyl compound unit content of 3%, 76 mol % of which existed in isolation.

EXAMPLE 25

A 100 μm thick and 1800 mm wide three-layer laminate film was prepared by blown-film extrusion using EVA 3 or EVA 15 as a base resin to which Ethylene Copolymer D or hydrotalcite "DH-4A" had been added as shown in Table 12 below. The same anti-fogging agent as described in Example 16 was then coated on the innermost layer with a brush roll coater having a roll width of 2000 mm at a coating speed of 8 m/min. The results of the evaluations are shown in Table 12 below.

EXAMPLE 26

A three-layer laminate film was prepared in the same manner as in Example 25, except for increasing the proportion of Ethylene Copolymer D. The results of the evaluations are shown in Table 12 below.

TABLE 12

| | Example 25 | | | Example 26 | | |
|---|---|---|---|---|---|---|
| | Outermost Layer | Intermediate Layer | Innermost Layer | Outermost Layer | Intermediate Layer | Innermost Layer |
| Thickness (μm) | 15 | 70 | 15 | 15 | 70 | 15 |
| Formulation (%): | | | | | | |
| EVA 3 | 90.0 | — | 90.0 | 50.0 | — | 50.0 |
| EVA 15 | — | 94.3 | — | — | 94.3 | — |
| Ethylene Copolymer D | 10.0 | — | 10.0 | 50.0 | — | 50.0 |
| Vinyl Compound Content (%) | (0.3) | — | (0.3) | (1.5) | — | (1.5) |
| DHT-4A | — | 5.7 | — | — | 5.7 | — |
| Anti-Fogging Agent | — | — | coated | — | — | coated |
| Performance Properties: | | | | | | |
| Weather Resistance (month) | | | 45 | | | 54 |
| Anti-Fogging Properties (month) | | | 38 | | | 48 |
| Heat-Retaining Properties (°C.) | | | 1.3 | | | 1.3 |
| Total Light Transmission (%) | | | 93 | | | 91 |

EXAMPLE 27

A three-layer laminate film was prepared in the same manner as in Example 25, except for decreasing the proportion of the Ethylene Copolymer D. The results of the evaluations are shown in Table 13 below.

EXAMPLE 28

A three-layer laminate film was prepared in the same manner as in Example 25, except for increasing the amount of hydrotalcite "DHT-4A". The results of the evaluations are shown in Table 13 below.

TABLE 13

| | Example 27 | | | Example 28 | | |
|---|---|---|---|---|---|---|
| | Outermost Layer | Intermediate Layer | Innermost Layer | Outermost Layer | Intermediate Layer | Innermost Layer |
| Thickness (μm) | 15 | 70 | 15 | 15 | 70 | 15 |
| Formulation (%): | | | | | | |
| EVA 3 | 95.0 | — | 95.0 | 90.0 | — | 90.0 |
| EVA 15 | — | 94.3 | — | — | 89.5 | — |
| Ethylene Copolymer D | 5.0 | — | 5.0 | 10.0 | — | 10.0 |
| Vinyl Compound Content (%) | (0.15) | — | (0.15) | (0.3) | — | (0.3) |
| DHT-4A | — | 5.7 | — | — | 10.5 | — |
| Anti-Fogging Agent | — | — | coated | — | — | coated |

TABLE 13-continued

|  | Example 27 | | | Example 28 | | |
| --- | --- | --- | --- | --- | --- | --- |
|  | Outer-most Layer | Inter-mediate Layer | Inner-most Layer | Outer-most Layer | Inter-mediate Layer | Inner-most Layer |
| Performance Properties: | | | | | | |
| Weather Resistance (month) | | 23 | | | 45 | |
| Anti-Fogging Properties (month) | | 39 | | | 38 | |
| Heat-Retaining Properties (°C.) | | 1.3 | | | 1.6 | |
| Total Light Transmission (%) | | 92 | | | 87 | |

EXAMPLE 29

A three-layer laminate film was prepared in the same manner as in Example 25, except for decreasing the amount of hydrotalcite "DHT-4A". The results of the evaluations are shown in Table 14 below.

EXAMPLE 30

A three-layer laminate film was prepared in the same manner as in Example 25, except that no anti-fogging agent was coated and, instead, an anti-fog additive (poly(ethylene oxide adduct of lauryl alcohol)) was incorporated in the innermost layer of the film. The results of the evaluations are shown in Table 14 below.

TABLE 14

|  | Example 29 | | | Example 30 | | |
| --- | --- | --- | --- | --- | --- | --- |
|  | Outer-most Layer | Inter-mediate Layer | Inner-most Layer | Outer-most Layer | Inter-mediate Layer | Inner-most Layer |
| Thickness (μm) | 15 | 70 | 15 | 15 | 70 | 15 |
| Formulation (%): | | | | | | |
| EVA 3 | 90.0 | — | 90.0 | 90.0 | — | 89.0 |
| EVA 15 | — | 99.3 | — | — | 94.3 | — |
| Ethylene Copolymer D | 10.0 | — | 10.0 | 10.0 | — | 10.0 |
| Vinyl Compound Content (%) | (0.3) | — | (0.3) | (0.3) | — | (0.3) |
| DHT-4A | — | 0.7 | — | — | 5.7 | — |
| Anti-Fogging Additive for Incorporation | — | — | — | — | — | 1.0 |
| Anti-Fogging Agent for Coating | — | — | coated | — | — | — |
| Performance Properties: | | | | | | |
| Weather Resistance (month) | | 45 | | | 45 | |
| Anti-Fogging Properties (month) | | 38 | | | 20 | |
| Heat-Retaining Properties (°C.) | | 1.0 | | | 1.2 | |
| Total Light Transmission (%) | | 93 | | | 90 | |

EXAMPLE 31

A 100 μm thick and 1800 mm wide two-layer laminate film was prepared by blown-film extrusion using a mixture of EVA 3 and Ethylene Copolymer D as the outermost layer and a mixture of EVA 13 and hydrotalcite "DH-4A" as the innermost layer according to the formulation shown in Table 15 below. The results of the evaluations are shown in Table 15 below.

EXAMPLE 32

A two-layer laminate film was prepared in the same manner as in Example 31, except that no anti-fogging agent was coated and, instead, an anti-fog additive (poly(ethylene oxide adduct of lauryl alcohol)) was incorporated into the innermost layer of the film. The results of the evaluations are shown in Table 15 below.

TABLE 15

|  | Example 31 | | Example 32 | |
| --- | --- | --- | --- | --- |
|  | Outer-most Layer | Inner-most Layer | Outer-most Layer | Inner-most Layer |
| Thickness (μm) | 40 | 60 | 40 | 60 |
| Formulation (%): | | | | |
| EVA 3 | 90.0 | — | 90.0 | — |
| EVA 13 | — | 92.0 | — | 91.0 |
| Ethylene Copolymer D | 10.0 | — | 10.0 | — |
| Vinyl Compound Content (%) | (0.3) | — | (0.3) | — |
| DHT-4A | — | 8.0 | — | 8.0 |
| Anti-Fog Additive | — | — | — | 1.0 |
| Anti-Fogging Agent | — | coated | — | — |
| Performance Properties: | | | | |
| Weather Resistance | 42 | | 42 | |

TABLE 15-continued

|  | Example 31 | | Example 32 | |
| --- | --- | --- | --- | --- |
|  | Outer-most Layer | Inner-most Layer | Outer-most Layer | Inner-most Layer |
| (month) | | | | |
| Anti-Fogging Properties (month) |  | 20 |  | 20 |
| Heat-Retaining Properties (°C.) |  | 1.3 |  | 1.2 |
| Total Light Transmission (%) |  | 91 |  | 91 |

COMPARATIVE EXAMPLE 5

A three-layer laminate film was prepared in the same manner as in Example 25, except for replacing the ethylene copolymer with a hindered amine in its side chain with a hindered amine type light stabilizer, bis(2,2,6,6-tetramethyl-4-piperidine) sebacate. The results of the evaluations are shown in Table 16 below.

COMPARATIVE EXAMPLE 6

A 100 μm thick three-layer laminate film was prepared using EVA base resins alone, and heat-retaining properties and transparency were evaluated for comparison. The results obtained are shown in Table 16 below.

TABLE 16

|  | Comparative Example 5 | | | Comparative Example 6 | | |
| --- | --- | --- | --- | --- | --- | --- |
|  | Outer-most Layer | Inter-mediate Layer | Inner-most Layer | Outer-most Layer | Inter-mediate Layer | Inner-most Layer |
| Thickness (μm) | 15 | 70 | 15 | 15 | 70 | 15 |
| Formulation (%): | | | | | | |
| EVA 3 | 99.7 | — | 99.7 | 100 | — | 100 |
| EVA 15 | — | 94.3 | — | — | 100 | — |
| DHT-4A | — | 5.7 | 10.0 | — | — | — |
| Commercially Available Hindered Amine Light Stabilizer | 0.3 | — | 0.3 | — | — | — |
| Anti-Fogging Agent | — | — | coated | — | — | — |
| Performance Properties: | | | | | | |
| Weather Resistance (month) |  | 12 |  |  | — |  |
| Anti-Fogging Properties (month) |  | 23 |  |  | — |  |
| Heat-Retaining Properties (°C.) |  | 1.2 |  |  | 0.4 |  |
| Total Light Transmission (%) |  | 91 |  |  | 94 |  |

As described and demonstrated above, the agricultural film according to the present invention has excellent receptivity to an anti-fogging agent coating (i.e., coating properties) to provide a coated film having high anti-fogging properties at low cost.

Further, the agricultural film according to the present invention which is obtained by compounding a thermoplastic resin with an ethylene copolymer with a hindered amine in the side chain thereof and a hydrotalcite compound and further compounding with an anti-fogging agent or coating an anti-fogging agent on the inner side of the resulting film or which is obtained by laminating an outermost layer (A″) containing an ethylene copolymer with a hindered amine in the side chain thereof and an innermost layer (B′) containing a hydrotalcite compound and further containing an anti-fogging agent or having coated on the inner side thereof an anti-fogging agent is superior to those containing conventional light stabilizers in terms of weather resistance, anti-fogging properties, heat-retaining properties, and transparency.

While the invention has been described in detail and with reference to specific examples thereof, it will be apparent to one skilled in the art that various changes and modifications can be made therein without departing from the spirit and scope thereof.

What is claimed is:

1. An agricultural film comprising (A′) an ethylene resin film containing an ethylene copolymer with a hindered amine in its side chain as a light stabilizer, and having coated on said ethylene resin film an anti-fogging agent comprising an inorganic hydrophilic colloidal substance and a hydrophilic organic compound, wherein said ethylene copolymer is a copolymer comprising (a) ethylene and (b) a vinyl compound represented by formula (I):

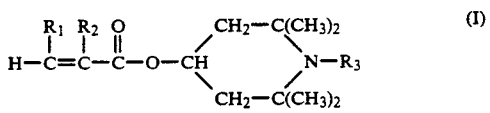

wherein $R_1$ and $R_2$, which may be the same or different, each represents a hydrogen atom or a methyl group; and $R_3$ represents a hydrogen atom or an alkyl group having from 1 to 4 carbon atoms, and the content of a unit derived from said vinyl compound (b) in said ethylene resin film (A′) is from 0.05 to 5.0% by weight.

2. An agricultural film as claimed in claim 1, wherein said ethylene copolymer is a copolymer comprising from 99 to 99.9 mol % of ethylene and from 0.01 to less than 1 mol % of a vinyl compound represented by formula (I).

3. An agricultural film as claimed in claim 1, wherein said ethylene resin film (A′) is a film of an ethylene resin selected from the group consisting of an ethylene-vinyl acetate copolymer, a low-density polyethylene, and a linear low-density polyethylene.

4. An anti-fogging agricultural film comprising (A) an ethylene resin film containing (1) an ethylene copolymer with a hindered amine in its side chain which is obtained by copolymerizing ethylene and a compound represented by the following formula (I):

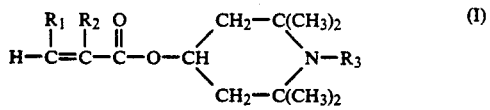

wherein $R_1$ and $R_2$, which may be the same or different, each represents a hydrogen atom or a methyl group; and $R_3$ represents a hydrogen atom or an alkyl group having from 1 to 4 carbon atoms, as a light stabilizer, wherein said ethylene copolymer is present in an amount such that said film (A) contains from 0.05 to 5% by weight of a unit derived from said compound according to formula (I) and (2) from 0.5 to 20% by weight of a hydrotalcite compound, and an anti-fogging agent coated on or incorporated in said film (A).

5. An agricultural film as claimed in claim 4, wherein said ethylene copolymer is a copolymer containing said compound of formula (I) in an amount of less than 1 mol % based on the total amount of ethylene and compound of formula (I), and having a melt flow rate of from 0.1 to 200 g/10 min.

6. An agricultural film as claimed in claim 5, wherein said ethylene copolymer is a copolymer comprising from 99 to 99.9 mol % of ethylene and from 0.01 to 1 mol % of the compound represented by formula (I).

7. An agricultural film as claimed in claim 4, wherein said ethylene resin film (A) is a film of an ethylene resin selected from the group consisting of an ethylene-vinyl acetate copolymer, a low-density polyethylene, and a linear low-density polyethylene.

8. An agricultural laminate film comprising (A) an ethylene resin film containing (1) an ethylene copolymer with a hindered amine in its side chain which is obtained by copolymerizing ethylene and a compound represented by the following formula (I):

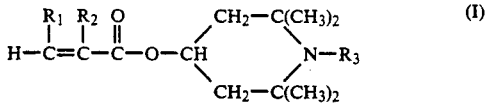

wherein $R_1$ and $R_2$, which may be the same or different, each represents a hydrogen atom or a methyl group; and $R_3$ represents a hydrogen atom or an alkyl group having from 1 to 4 carbon atoms, as a light stabilizer, wherein said ethylene copolymer is present in an amount such that said film (A) contains from 0.05 to 5% by weight of a unit derived from said compound according to formula (I) and (2) from 0.5 to 20% by weight of a hydrotalcite compound as an outer layer and (B) an anti-fogging resin film as an inner layer.

9. An agricultural film as claimed in claim 8, wherein said ethylene copolymer is a copolymer containing said compound of formula (I) in an amount of less than 1 mol % based on the total amount of ethylene and compound of formula (I), and having a melt flow rate of from 0.1 to 200 g/10 min.

10. An agricultural film as claimed in claim 9, wherein said ethylene copolymer is a copolymer comprising from 99 to 99.9 mol % of ethylene and from 0.01 to 1 mol % of the compound represented by formula (I).

11. An agricultural film as claimed in claim 8, wherein said ethylene resin film (A) is a film of an ethylene resin selected from the group consisting of an ethylene-vinyl acetate copolymer, a low-density polyethylene, and a linear low-density polyethylene.

12. An agricultural laminate film comprising (A") an ethylene resin film as an outermost layer containing an ethylene copolymer with a hindered amine in its side chain which is obtained by copolymerizing ethylene and a compound represented by the following formula (I):

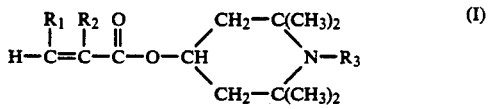

wherein $R_1$ and $R_2$, which may be the same or different, each represents a hydrogen atom or a methyl group; and $R_3$ represents a hydrogen atom or an alkyl group having from 1 to 4 carbon atoms, as a light stabilizer, wherein said ethylene copolymer is present in an amount such that said film (A") contains from 0.05 to 5% by weight of a unit derived from said compound according to formula (I), and (C) a thermoplastic resin film as an innermost layer containing from 0.5 to 20% by weight of a hydrotalcite compound, and an anti-fogging agent coated on or incorporated in said film (C).

13. An agricultural laminate film as claimed in claim 12, wherein said ethylene copolymer is a copolymer containing said compound of formula (I) in an amount of less than 1 mol % based on the total amount of ethylene and compound of formula (I), and having a melt flow rate of from 0.1 to 200 g/10 min.

14. An agricultural laminate film as claimed in claim 13, wherein said ethylene copolymer is a copolymer comprising from 99 to 99.9 mol % of ethylene and from 0.01 to 1 mol % of the compound represented by formula (I).

15. An agricultural laminate film as claimed in claim 13, wherein said ethylene resin film (A") is a film of an ethylene resin selected from the group consisting of an ethylene-vinyl acetate copolymer, a low-density polyethylene, and a linear low-density polyethylene.

16. An agricultural laminate film comprising (A") an ethylene resin film as an outermost layer containing an ethylene copolymer with a hindered amine in its side chain which is obtained by copolymerizing ethylene and a compound represented by the following formula (I):

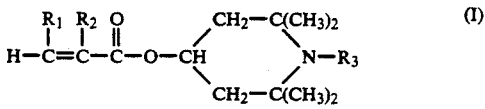

wherein $R_1$ and $R_2$, which may be the same or different, each represents a hydrogen atom or a methyl group; and $R_3$ represents a hydrogen atom or an alkyl group having from 1 to 4 carbon atoms, as a light stabilizer, wherein said ethylene copolymer is present in an amount such that said film (A") contains from 0.05 to 5% by weight of a unit derived from said compound according to formula (I), (C') a thermoplastic resin film as an intermediate layer containing from 0.5 to 20% by weight of a hydrotalcite compound, and (B') an anti-fogging resin film as an innermost layer.

17. An agricultural laminate film as claimed in claim 16, wherein said ethylene copolymer is a copolymer containing said compound of formula (I) in an amount of less than 1 mol % based on the total amount of ethylene and compound of formula (I), and having a melt flow rate of from 0.1 to 200 g/10 min.

18. An agricultural laminate film as claimed in claim 17, wherein said ethylene copolymer is a copolymer comprising from 99 to 99.9 mol % of ethylene and from 0.01 to 1 mol % of the compound represented by formula (I).

19. An agricultural laminate film as claimed in claim 16, wherein said ethylene resin film (A") is a film of an ethylene resin selected from the group consisting of an ethylene-vinyl acetate copolymer, a low-density polyethylene, and a linear low-density polyethylene.

* * * * *